US012729095B2

(12) United States Patent
Lo Jacono et al.

(10) Patent No.: US 12,729,095 B2
(45) Date of Patent: Sep. 8, 2026

(54) SUSPENSION DEVICE AND USE THEREOF IN AN ELEVATOR SYSTEM, AND METHOD

(71) Applicant: Inventio AG, Hergiswil (CH)

(72) Inventors: Romeo Lo Jacono, Gravesano (CH); Gilles Trottman, Immensee (CH); Valerio Villa, Colverde (IT); Eric Wang, Lucerne (CH)

(73) Assignee: INVENTIO AG, Hergiswil (CH)

( * ) Notice: Subject to any disclaimer, the term of this patent is extended or adjusted under 35 U.S.C. 154(b) by 671 days.

(21) Appl. No.: 18/260,097

(22) PCT Filed: Dec. 24, 2021

(86) PCT No.: PCT/EP2021/087632
§ 371 (c)(1),
(2) Date: Jun. 30, 2023

(87) PCT Pub. No.: WO2022/144322
PCT Pub. Date: Jul. 7, 2022

(65) Prior Publication Data

US 2024/0059523 A1 Feb. 22, 2024

(30) Foreign Application Priority Data

Dec. 31, 2020 (EP) .................................... 20217995

(51) Int. Cl.
*B66B 1/34* (2006.01)
*B66B 5/14* (2006.01)
(Continued)

(52) U.S. Cl.
CPC ............ *B66B 1/3476* (2013.01); *B66B 5/145* (2013.01); *B66B 5/18* (2013.01); *B66B 7/042* (2013.01)

(58) Field of Classification Search
CPC .......... B66B 5/18; B66B 1/3484; B66B 7/04; B66B 7/08
See application file for complete search history.

(56) References Cited

U.S. PATENT DOCUMENTS 5,149,922 A * 9/1992 Kondou ................ B66B 1/3484 187/401
5,156,239 A * 10/1992 Ericson ................. B66B 1/3476 187/393
(Continued)

FOREIGN PATENT DOCUMENTS

EP 0151949 A2 8/1985
EP 1955973 A1 * 8/2008 ............... B66B 7/08
(Continued)

*Primary Examiner* — Michael A Riegelman
(74) *Attorney, Agent, or Firm* — Shumaker, Loop & Kendrick, LLP

(57) ABSTRACT

A suspension device has at least one brake for braking an elevator car relative to a stationary component of an elevator system, a brake holding assembly holding the brake on the elevator car, and a support means holding assembly holding a support means on the elevator car. The support means connects the elevator car to a counterweight of the elevator system. The brake holding assembly holds the brake against the elevator car such that the brake moves relative to the elevator car in a force direction produced by the brake. The support means holding assembly holds the support means against the elevator car such that the support means moves relative to the elevator car substantially in a force direction produced by the support means. A load measuring device measures an exerted force produced by relative movement of the support means and/or the brake.

16 Claims, 4 Drawing Sheets

(51) Int. Cl.
*B66B 5/18* (2006.01)
*B66B 7/04* (2006.01)

(56) References Cited

U.S. PATENT DOCUMENTS 6,318,505 B1 * 11/2001 De Angelis ............. B66B 17/34
187/292
6,450,299 B1 * 9/2002 Lysaght ................. G01G 19/18
187/393
6,483,047 B1 * 11/2002 Zaharia .................. G01G 19/18
187/393
7,604,099 B2 * 10/2009 Kigawa ..................... B66B 5/18
188/161
11,772,933 B2 * 10/2023 Bütler ................... B66B 1/3484
187/375
11,897,728 B2 * 2/2024 Kattainen ................. B66B 5/02
12,545,550 B2 * 2/2026 Koskinen .................. B66B 1/44
2006/0180406 A1 * 8/2006 Gremaud .................. B66B 1/32
187/355
2008/0006486 A1 * 1/2008 Fischer ................. B66B 1/3484
187/393
2009/0139802 A1 * 6/2009 Maki ......................... B66B 7/06
73/826
2022/0363515 A1 * 11/2022 Bütler ........................ B66B 7/04
2023/0286780 A1 * 9/2023 Bütler ..................... B66B 7/022
2024/0059523 A1 * 2/2024 Lo Jacono ................ B66B 7/08
2025/0066157 A1 * 2/2025 Lo Jacono ............ B66B 1/3484

FOREIGN PATENT DOCUMENTS

EP 1278694 B1 12/2012
WO WO-2006097138 A1 * 9/2006 ............... B66B 7/06

* cited by examiner

SUSPENSION DEVICE AND USE THEREOF IN AN ELEVATOR SYSTEM, AND METHOD

FIELD

The present invention relates to a suspension device for securing a brake and at least one support means, and for measuring a load. The invention also relates to an elevator system equipped with such a suspension device. The invention also relates to a method for measuring a load acting on an elevator car, and to a method for setting a force to be exerted on an elevator car by a drive device in response to a load change in the elevator car, and to a method for detecting a slack support means by measuring a load change, using the suspension device described herein.

BACKGROUND

In an elevator system, an elevator car is typically moved within a vertical elevator shaft between different floors. In this case, movement of the elevator car is brought about by means of a drive device that acts for example on support means, such as cables or belts that hold the elevator car. The elevator car is usually guided by guide rails during its movement. In order to bring the elevator car to a stop at a desired floor, the displacement movement is braked by appropriately controlling the drive device.

If persons enter or leave the elevator car held at a floor, a load change brought about as a result can cause the driving quality, in particular the start-up of the elevator car, to be impaired, and thus the travel comfort of the passengers to be reduced. However, the problem can in particular arise here that a load change in the car during the stop leads to an abrupt change in position of the car when the brake is subsequently released, due to the changed car load.

Approaches for being able to measure the load acting on an elevator car have been described. For example, EP 1 278 694 B1 describes a load receiving means for cable elevators having an integrated load measuring device. An alternative load measuring device for an elevator car is described in EP 0 151 949 A2. A brake load measuring system in which load measuring cells interact with a brake is described in U.S. Pat. No. 6,483,047 B1.

Inter alia, there may be a need for a suspension device which advantageously enables the braking of an elevator car and, moreover, is designed to be able to measure the load change brought about in the elevator car and to detect unexpected states of the support means, in particular slack support means. Furthermore, there may be a need for an elevator system equipped with such a suspension device. There may be also a need for an advantageous method for measuring a load acting on an elevator car. Moreover, there may be a need for an advantageous method for setting a force exerted on an elevator car by a drive device in response to a load change in the elevator car. Finally, there may be a need for an advantageous method for detecting a slack support means by measuring a load change.

SUMMARY

This need is met by a suspension device, an elevator system, a method for measuring a load acting on an elevator car, a method for setting a force to be exerted on an elevator car by a drive device, and by a method for detecting a slack support means according to the following description.

According to the invention, a suspension device which makes it possible to secure both at least one brake and at least one support means on the elevator car is provided. This makes it possible to secure the at least one brake and the at least one support means to the car in a simple manner and, in comparison with two independent suspension devices, with reduced assembly effort.

According to the invention, the suspension device for securing a brake and at least one support means, as well as for measuring a load, has at least one brake for braking the elevator car relative to a stationary component of the elevator system. Furthermore, the suspension device has a brake holding assembly for holding the at least one brake on the elevator car. The suspension device further comprises a support means holding assembly for holding the support means on the elevator car. The support means is designed for connecting the elevator car to a counterweight of the elevator system. The brake holding assembly is configured such that the brake can be held on the elevator car by means of the brake holding assembly, in such a way that the brake holding assembly can be deformed relative to the elevator car, substantially in a force direction produced by the brake. The support means holding assembly is configured such that the support means is to be held on the elevator car, by means of the support means holding assembly, in such a way that the support means holding assembly can be deformed relative to the elevator car, substantially in an exerted force produced by the support means.

In a preferred embodiment of the suspension device, the suspension device further comprises a load measuring device. The load measuring device is arranged in such a way that an exerted force, which arises due to the deformation of the support means and/or the brake, can be measured by the load measuring device.

In summary, a basic concept of the suspension device proposed herein can be considered that of enabling four functionalities with a single device, namely the securing of brakes of the elevator car, the securing of the support means to the elevator car, the measuring of a load change acting in the elevator car and the determination of a slack support means. For this purpose, the suspension device is constructed substantially in two parts. A first part comprises the brake and the brake holding assembly. The brake is designed to generate forces between the elevator car and a stationary component of the elevator system, such as a guide rail. These forces counteract a movement of the elevator car or its weight force, in order to brake the movement of the elevator car provided with the brake, and/or to hold it stationary on the stationary component. The brake holding assembly is designed to attach the brake to the elevator car.

A second part of the suspension device comprises the support means holding assembly. The support means holding assembly is designed to attach the support means to the elevator car.

In this case, the two parts of the suspension device are designed in such a way that they enable deformation in force direction produced by the respective element (brake, support means). This makes it possible to measure this deformation relative to a fixed point of the car. Alternatively, the deformations can be measured relative to one another. The force effects caused by the support means and/or brake can thus be made measurable.

In one embodiment, the suspension device is designed such that the load measuring device is arranged in such a way that it can measure an exerted force which arises due to the relative displacement of the support means and the brake, and thus a superimposed deformation of the two dominant forces acting on the suspension device can be measured by means of a load measuring device. This makes it possible to measure the exerted forces relevant for the control of the elevator system, using a single load measuring device. This makes it possible to realize a comparatively simple and cost-effective, multifunctional suspension device. By means of a corresponding evaluation of the measurement of the superimposed deformation, and by informing the controller of the operating point at which the elevator system should be located, the individual deformations can be deduced. Thus, an exerted force of the support means can be calculated and an exerted force of the brake can be calculated from the superimposed measurement signal, which includes both the exerted force of the support means and the exerted force of the brake.

In a preferred embodiment of the suspension device described above and in the following, the load measuring device is arranged between the brake holding assembly and the support means holding assembly.

It is thus possible to provide, in a simple manner, a suspension device which makes it possible to measure both the exerted force of the support means and the exerted force of the brake, by means of one load measuring device.

Thus, both the brake holding assembly and the support means holding assembly are designed in such a way that they are not fixed in a targeted manner in an absolutely stationary manner on the elevator car, but rather can move at least slightly relative to the elevator car, in particular in a direction of the forces produced, that is to say typically a direction in which the elevator car moves during its travel, or a direction opposite thereto.

The load measuring device is thus operatively connected to the brake or the support means via the brake holding assembly or the support means holding assembly, respectively. The movement of one of these elements relative to the elevator car can thus be measured by the load measuring device. In particular, the sum of the relative movement of these elements with respect to one another can be measured. Accordingly, the load measuring device can measure forces which act on the elevator car, in particular in the movement direction, i.e. typically in the vertical direction. In particular, load changes and changes in the tension of the support means can be determined by means of the load measuring device.

In a preferred embodiment of the suspension device described above and in the following, the support means holding assembly and the brake holding assembly are each arranged in an elastically deformable manner on a web arrangement which is mounted in a stationary manner on the elevator car.

In this embodiment, the support means holding assembly and the brake holding assembly are operatively connected to one another not only via the load measuring device connecting them, but rather additionally connected to a web arrangement. In this case, the web arrangement is fixed to the elevator car in a stationary manner. This web arrangement should be configured in such a way that a predominant proportion of the forces acting between the brake holding assembly and the support means holding assembly does not act on the load measuring device, but rather on the web arrangement. In particular, the web arrangement should be configured such that, for example in the event of failure of the load measuring device, the entirety of the forces acting between the brake holding assembly and the elevator car, and between the support means holding assembly and the elevator car, can be transmitted solely via the web arrangement, without the web arrangement breaking.

Thus, the forces acting on the elevator car can be measured very precisely and reproducibly with the aid of the load measuring device, despite its mechanically relatively weak design.

In a preferred embodiment of the suspension device described above and in the following, the brake holding assembly and the support means holding assembly are arranged, dimensioned and configured in such a way that these deform substantially elastically in the case of forces which are transmitted to the brake holding assembly and support means holding assembly in normal operation.

In other words, the brake holding assembly and the support means holding assembly can be arranged, dimensioned and configured such that they experience only elastic deformation in the event of forces which typically occur during normal operation of the elevator system, when the elevator car is to be held at a floor for example.

To this end, several different influencing variables can be appropriately selected. For example, the spatial arrangement of the support means holding assembly and/or the brake holding assembly, i.e. in particular its position, orientation and/or extension direction, can have an effect on its mechanical load-bearing capacity and/or its elastic deformability. In addition, the dimensioning of the corresponding holding assemblies, i.e. in particular their cross section, width, length, height, etc., can affect the load-bearing capacity and/or elastic deformability of the holding assemblies. Furthermore, other configuration parameters such as a material used, processing carried out during production, etc., can influence the load-bearing capacity and/or elastic deformability of the holding assemblies. All of these parameters can be suitably selected such that the holding assemblies are configured, for example depending on properties of the elevator car (e.g., its weight and payload) and/or depending on requirements of the entire elevator system (e.g., safety requirements regarding braking processes), in normal operation of the elevator system, to react to forces acting thereon only with an elastic deformation, but without plastic deformation.

Due to the fact that the support means holding assembly and the brake holding assembly deform only elastically relative to the web arrangement in normal operation, the forces transmitted proportionally to the load measuring device can always be substantially proportional to the entirety of the forces acting between the brake holding assembly and support means holding assembly and the elevator car.

In a preferred embodiment of the suspension device described above and in the following, the brake holding assembly and the support means holding assembly are arranged, dimensioned and configured such that, in the case of forces transmitted to the brake holding assembly and support means holding assembly, in normal operation, they deform in such a way that they move towards and/or away from one another by less than 2 mm, particularly preferably by less than 1 mm.

In other words, although the support means holding assembly and the brake holding assembly should be able to move slightly, relative to the elevator car, during a braking process or acceleration process, the extent of this relative movement should be limited by the specifically selected configuration of the corresponding holding assembly to such an extent that no relative movements of more than 1 mm, for example, occurs under normal conditions. For the relative movement of the two holding assemblies relative to one another, this results in a relative movement of less than 2 mm. For many applications, it can even be advantageous if the holding assemblies exclusively allow relative movements, with respect to the car, of less than 0.5 mm under normal conditions. This means that a maximum movement of 1 mm results for the relative movement of the holding assemblies relative to one another.

In one embodiment, the web arrangement is arranged substantially in parallel with the exerted force of the support means or the brakes. In this embodiment, at least a portion of the holding assemblies is preferably arranged substantially perpendicularly to the direction of force application of the support means or the brakes, i.e. the portion of the holding assemblies is arranged substantially perpendicularly to the web arrangement.

In a preferred embodiment of the suspension device described above and in the following, the brake holding assembly, the support means holding assembly and the web arrangement are formed in one piece by a common component.

For example, the brake holding assembly, the support means holding assembly and the web arrangement may be formed in one piece with a common stamped sheet metal part.

In other words, a single component can form the brake holding assembly, the support means holding assembly and the web arrangement.

In this case, the entire component can be easy to produce and can be adapted to the forces to be absorbed and to be transmitted for example by a suitable selection of a sheet metal used, in particular with regard to a thickness of the sheet metal and a material of the sheet metal.

The one-piece design of all regions of such a component makes it possible, for example, to prevent increased wear occurring at weak points, which wear would otherwise occur, in a multi-part component, at transitions between components. The one-piece component can also withstand repeatedly occurring mechanical loads over the long term.

In this case, in the one-piece component, possibilities can be provided for fixedly arranging the component on the elevator car. In particular, holes can be provided on the web arrangement, for example, by means of which the component can be secured to the elevator car using screws. In a preferred embodiment of the suspension device described above and in the following, the load measuring device comprises a force transmission element. The load measuring device is fixed to the brake holding assembly. The force transmission element is connected to the support means holding assembly. The force transmission element acts on a strain gage of the load measuring device.

Using a strain gage for this task enables a very robust design of the load measuring device. Furthermore, the strain gage makes it possible to measure the acting forces very precisely and reproducibly.

In a preferred embodiment of the suspension device described above and in the following, the load measuring device is configured to generate an electrical signal which represents the force acting on the force transmission element.

For example, the load measuring device can have a sensor system that can monitor physical parameters that allow the forces acting on the force transmission element to be inferred. The sensor system can generate electrical signals on the basis of the monitored physical parameters. Such electrical signals can be forwarded in a simple manner and, for example, transferred to a controller of the elevator system or an external monitoring device. For example, the electrical signal can be easily processed in that the different exerted forces, that is to say the exerted force of the support means and the exerted force of the brake, are separated from one another and assigned to the relevant exerted forces. Based on the signals, the forces acting on the elevator car can then be inferred. For example, the payload is currently present in the elevator car can thereby be communicated to the controller of the elevator system. Furthermore, it is in particular also possible to communicate to the elevator controller when the force changes in such a way that it is possible to infer a slack support means.

In a preferred embodiment of the suspension device described above and in the following, the brake is configured as a holding brake in order to hold the elevator car in a stationary manner, counter to its weight force, during a stop. The brake is preferably also configured as a safety brake, in order to brake the elevator car in the case of an emergency, in particular in the event of a free fall. The suspension device can have two brakes, in particular in the brake holding assembly. In other words, the brake should at least be designed in such a way that it can be used to hold the elevator car stationary on the stationary component of the elevator system that interacts with the brake, i.e. for example on a guide rail, while the elevator car is stopped at a floor, for example. As such a holding brake, the brake can prevent the elevator car from moving due to changes in load.

It can furthermore be advantageous to design the brake to be even more loadable, such that it can also act as a safety brake. In this case, the brake should be configured to be able to generate very large forces between the elevator car and the stationary component, in order, for example, to be able to brake the elevator car to a standstill over a short distance even in the event that all of the support means holding the elevator car should break. In order to be able to reliably transmit the very high forces, which occur briefly during such a safety braking, from the brake to the elevator car, the suspension device must be designed accordingly. The suspension device must in particular be configured to be sufficiently stable in order not to break in the case of the high forces, it being possible for plastic deformations to be permissible.

In a preferred embodiment, the brake holding assembly has space for two brakes, such that the suspension device can be equipped with two brakes. The second brake makes it possible for the high forces required for the catch to be provided quickly.

Therefore, using a suspension device according to an embodiment, as described above, in an elevator system according to an embodiment of the second aspect of the invention, an elevator car, on which the suspension device is held, can reliably interact for example by means of its brake with the guide rail, in order to be able to brake the elevator car.

In a preferred embodiment, the elevator system has, as described above and in the following, an elevator car, a guide rail and a suspension device, as described above and in the following. The elevator car is movable along the guide rails. The suspension device is held on the elevator car. The brake is configured to cooperate with the guide rail in order to brake the elevator car.

In a preferred embodiment of the elevator system, as described above and in the following, the suspension device is arranged in a lower half of the elevator car.

It proves advantageous with respect to the forces which act on the elevator car, in particular the forces which are guided to the elevator car via the support means, to arrange the suspension device in the lower half of the elevator car.

In addition, the suspension device can be used within the scope of a method according to an embodiment of the third aspect of the invention in order to be able to measure the current load acting on the elevator car. In particular, temporary load changes can be measured.

In a preferred embodiment of the method for measuring a load acting on an elevator car, the method comprises:

activating the at least one of the brakes of a suspension device held on the elevator car, as described above and in the following, while the elevator car is stationary; and measuring the load acting on the elevator car by means of the load measuring device of the suspension device.

For example, the brake of the suspension device can be activated for this purpose, while the elevator car approaches a standstill at a floor. In this case, the brake can, for example, be activated only after the elevator car has been stopped at the floor by suitable control of the drive device. Alternatively, the brake can be used to actively brake a movement of the elevator car to a standstill, it then being possible for the brake to remain activated during the standstill.

The activated brake can prevent the elevator car from moving during a stop at a floor, for example when passengers are get in or out. However, the passengers getting in or out results in a load change in the elevator car. During use of the suspension device described herein, the load measuring device thereof can be used to determine such load changes. This can be used, inter alia, to be able to detect overcrowding of the elevator car and thus an overload.

Alternatively or additionally, according to an embodiment of the fourth aspect of the invention, a load change in the car can be measured using the method described, and the information thus obtained can be used to set the force exerted by the drive device on the elevator car in such a way that the measured load change is compensated.

According to a preferred embodiment of the method for setting a force to be exerted by a drive device on an elevator car in response to a load change in the elevator car, as described above and in the following, the method comprises:

measuring the load change using a method according to the third aspect of the invention, as described above and in the following; and setting the force exerted by the drive device on the elevator car such that the measured load change is compensated.

In other words, the load measuring device can first be used to measure how much heavier or lighter the elevator car has become as a result of passengers getting in or out, respectively. Without corresponding countermeasures, the load change would result in the elevator car abruptly dropping downward or sliding upward when the holding brake is subsequently released, since the resilient support means holding the elevator car would lengthen or shorten as a result of the load change. The load change in the elevator car can be measured by means of the method, such that the drive device can be controlled accordingly, in order to be able to suitably adapt the force acting on the support means before the holding brake is released. A lowering or upward slipping of the elevator car after the release of the holding brake is thus prevented. The described process is also known under the term "pretorquing."

In a preferred embodiment of the method, before the load change occurs a force measured by the load measuring device is measured as the reference force. After the brake has been activated and the load in the elevator car has changed, the force exerted on the elevator car is then set in such a way that the load measuring device measures a force corresponding to the reference force.

Thus, an absolute measurement of the forces produced by the load change is not necessarily required. A control signal can be determined, which is used to set the torque, which is instead set merely by successively increasing the torque or changing the torque. At the same time, the way in which in current force measured by the load measuring device changes can be monitored. If the force corresponds to the initially determined reference value, this means that the torque produced by the drive device is suitably set.

According to an embodiment of the fifth aspect of the invention, a slack support means can be detected, the method comprising:

measuring the load change using the method according to the second aspect of the invention, as described above and in the following; and determining a load change that is greater than a predetermined limit value.

If a support means is slack, the suspension device is no longer pretensioned in the direction of the support means. The load measured by the suspension device therefore changes abruptly and very significantly. In the event of a load change which exceeds a certain limit value or occurs at a certain point in time during the operation of the elevator system, it can thus be concluded that this load change is caused by a change in the support means tension, in the extreme case due to a complete slackening of the support means, and not by means of passengers getting in or out. It is also possible to detect slow slackening in the support means that occurs over time.

In a preferred embodiment of the method according to the fifth aspect of the invention, the load change is measured after holding at a floor and substantially immediately before departure. In the event of a load change exceeding a predetermined limit value, the at least one brake is operated in a catch mode.

It can thus be ensured that the elevator system is transferred to a safe operating mode even in the case of a slack cable, before the next floor is approached. After the detection of the slack support means, the elevator system is transferred directly into the catch mode by activating the brake.

Furthermore, the device, as well as the methods, as described above and in the following, can be used to ensure that there is no longer any maintenance technician in the car. For example, the car weight can thus be measured before switching from normal operation to maintenance operation, and this value can then be compared with a value measured after the maintenance work, before switching back to normal operation. If there is a deviation, switching back to normal operation can be prevented. This is advantageous in particular in elevator systems which do not have a head space. In contrast with a conventional load measurement in the car floor, in which a person is detected only if their weight is on the car floor, the load measurement at the brake of the car, as described above and in the following, allows such a use.

It is pointed out that some of the possible features and advantages of the invention are described herein with reference to different embodiments, on the one hand of the suspension device itself and on the other hand of the elevator system designed therewith, as well as the associated uses of this suspension device in the methods described above and in the following. A person skilled in the art will recognize that the features can be suitably combined, adapted, or replaced in order to arrive at further embodiments of the invention.

Embodiments of the invention will be described below, with reference to the accompanying drawings, neither the drawings nor the description being intended to be interpreted as limiting the invention.

The drawings are merely schematic, and not to scale. In the different figures, the same reference signs denote identical or functionally identical features.

DETAILED DESCRIPTION

Figure 1:
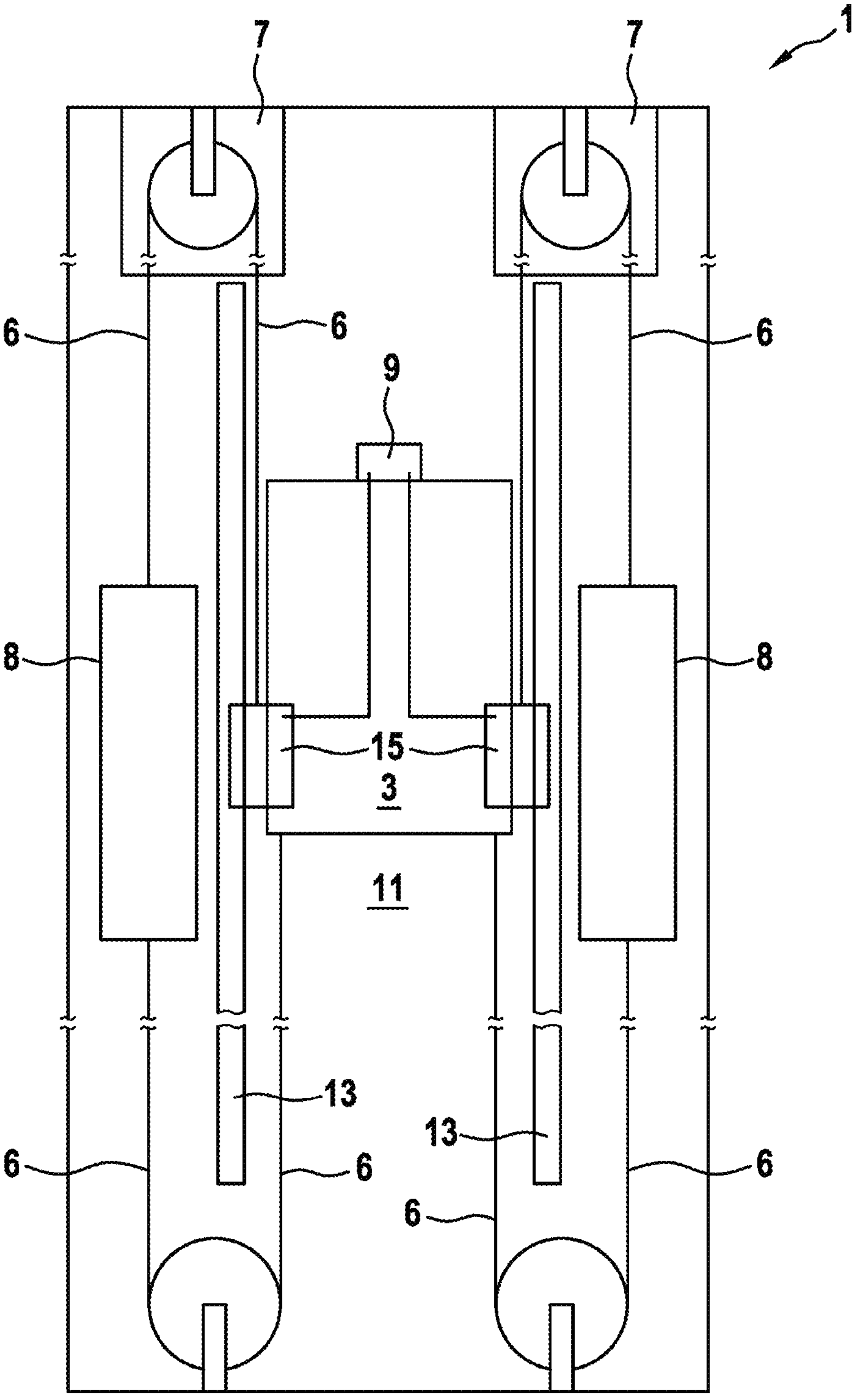
FIG. 1 shows a highly schematic view of an elevator system according to an embodiment of the present invention.
Figure 2:
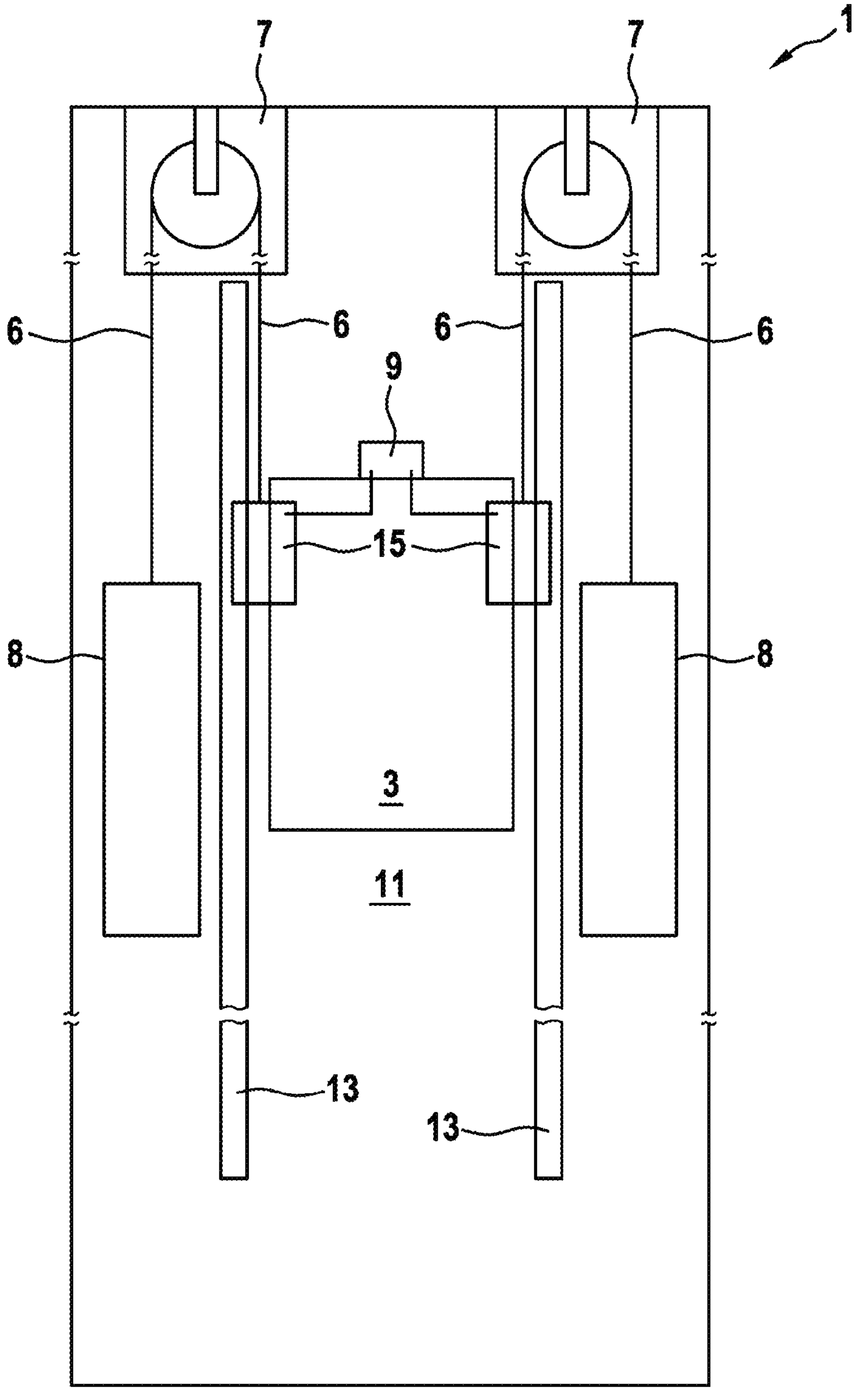
FIG. 2 shows a highly schematic view of an elevator system according to an embodiment of the present invention.
Figure 3:
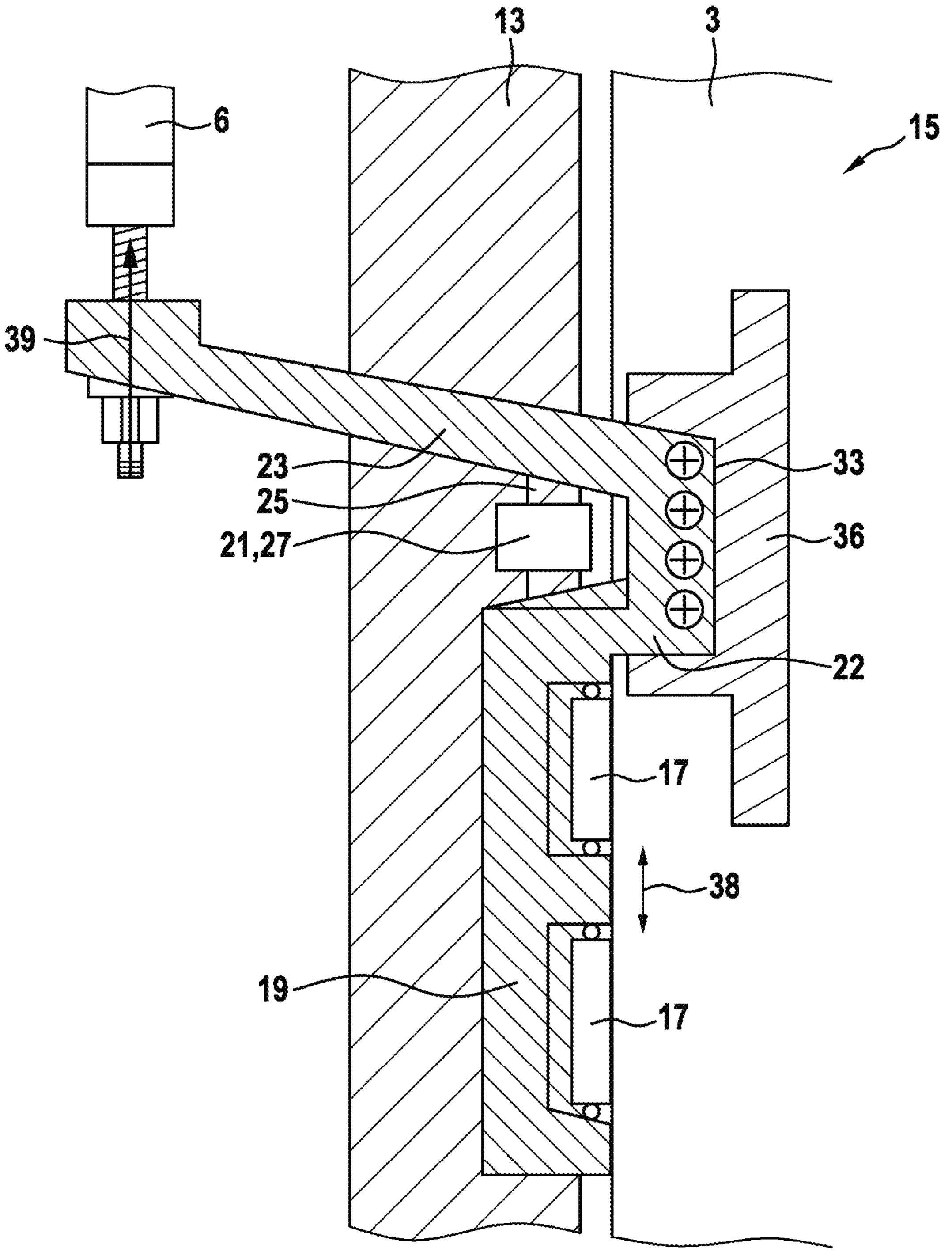
FIG. 3 shows a perspective view of a suspension device according to an embodiment of the present invention.
Figure 4:
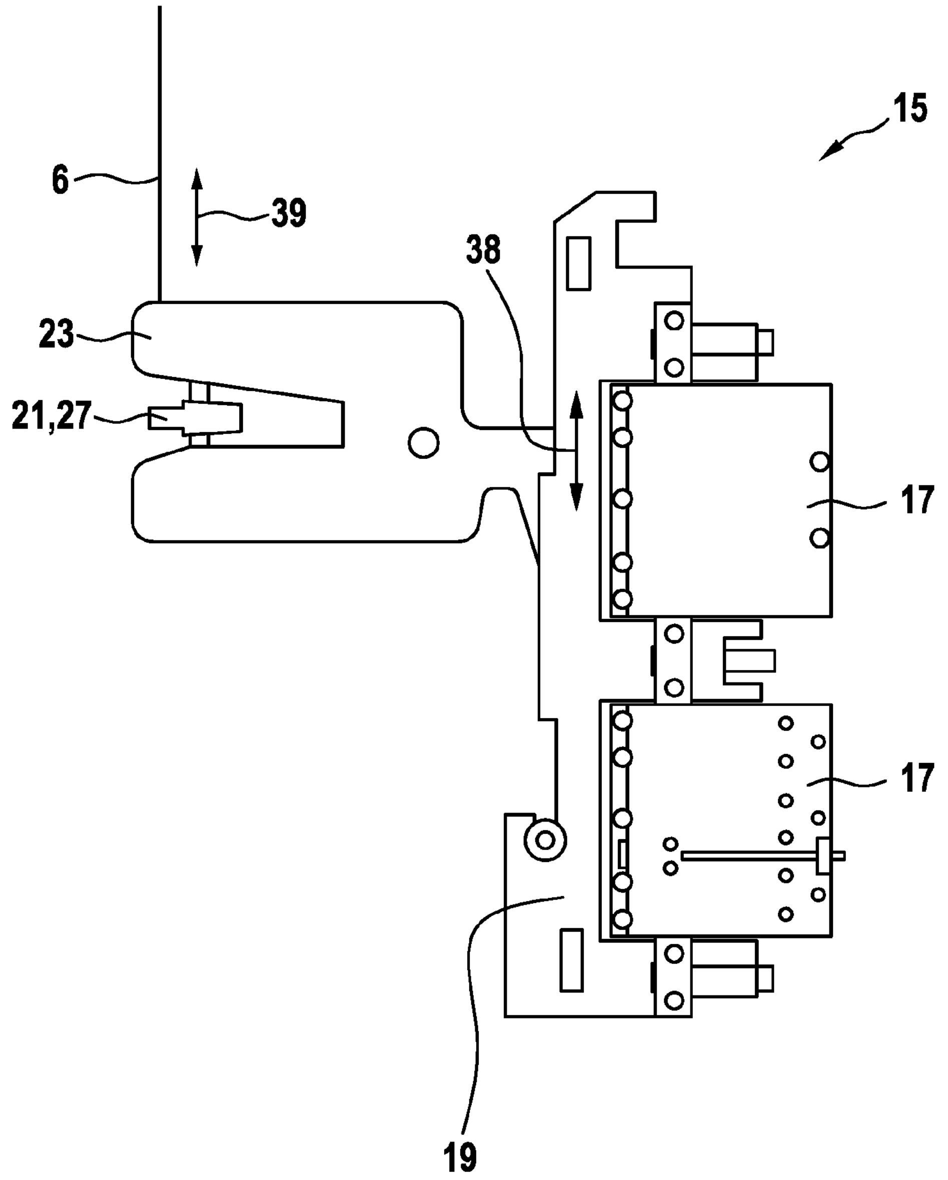
FIG. 4 shows a perspective view of a suspension device according to an alternative embodiment of the present invention.

FIGS. 1 and 2 show differently designed elevator systems 1 comprising a suspension device 15 according to two embodiments of the present invention. In both embodiments, the elevator system 1 is designed having a dual drive, that is to say having two drives 7 which are arranged, by way of example, in the shaft head. In both embodiments, the elevator systems 1 have two counterweights 8 which are movable in the opposite direction to an elevator car 3. FIG. 3 shows a detail view of a specific embodiment of such a suspension device 15. FIG. 4 shows a further embodiment of the suspension device 15.

The elevator system 1 shown in FIG. 1 comprises an elevator car 3 which can be held by belt-like or cable-like support means 6 and can be moved in an elevator shaft 11. For this purpose, the support means 6 can be moved by a drive device 7, for example in the form of a sheave drive. The drive device 7 is mounted in the shaft head of the elevator system; however, the drive device 7 could also be mounted in the region of the shaft pit floor of the elevator system. The drive device 7 is controlled by a controller 9, which in this embodiment is located on the car roof. During its movement, the elevator car 3 is guided on both sides on at least one stationary component in each case, which component is designed as a guide rail 13. In this embodiment, the elevator installation 1 further comprises two support means 6 below the elevator car 3. These support means 6 each lead from a lower end of the elevator car 3, over a deflection roller on the shaft pit floor, to a lower part of the respective counterweight 8.

In particular, in order to be able to keep the elevator car 3 stationary during a stop at a desired position, such as at a floor, the elevator car 3, after it has been moved to the desired position by means of the drive device 7, can be temporarily fixed to the guide rails 13 with the aid of brakes 17 (not shown; but cf. FIGS. 3 and 4 below) provided on its braking devices 15. The suspension device 15 can have two brakes (not shown) per suspension device, that is to say for each of the two suspension devices 15. In this case, each of the brakes 17 is secured to the elevator car 3 with the aid of a brake holding assembly 19 (not shown). In this embodiment, the suspension device is arranged in the lower half of the elevator car 3.

FIG. 2 shows a further embodiment of an elevator system 1 according to the invention. As can be seen from this embodiment, the lower support means of the embodiment according to FIG. 1 are not absolutely necessary. The suspension device 15 is again shown only schematically and can be designed in detail in a similar manner to the suspension device 15 in FIG. 3. The elevator system 1 has an elevator car 3 and two counterweights 8. The elevator system 1 comprises two drive devices 7, the drive devices being arranged in the head of the elevator shaft 11. In this embodiment, the suspension device 15 is evidently arranged in the upper half of the elevator car 3.

The suspension device 15 is shown schematically in FIG. 3. The suspension device 15 comprises a support means holding assembly 23, on the end of which the support means 6 is secured. The force 39 introduced into the support means holding assembly 23 by the support means 6 acts on this securing point. The support means holding assembly 23 is connected to a web arrangement 22. The web arrangement 22 extends substantially perpendicularly and is fixed to the elevator car 3. In this embodiment, the holding device 15 further comprises a web holding assembly 36. In this case, the web arrangement 22 is additionally fixed to the elevator car 3. The brake holding assembly 19 is integrally formed at the lower end of the web arrangement 22, the brake holding assembly, similarly to the web arrangement 22, extending substantially perpendicularly. Two recesses are provided in the brake holding assembly 19, in each of which recesses a brake 17 is arranged. In this embodiment, the suspension device 15 shown therefore comprises two brakes 17. The brakes 17 interact with the guide rail 13 and thus make it possible, via the suspension device 15, to fix the car 3, if required, at least temporarily in a stationary manner in relation to the guide rail 13. In such a fixed state, a force acts between the brakes 17 and the brake holding assembly 19, in one of the directions of the arrow 38. The suspension device 15 further comprises a load measuring device 21 which is arranged between the support means holding assembly 23 and the brake holding assembly 19. The load measuring device 21 comprises a strain gage 27 and a force transmission element 25.

The direction of the force arrow 39 substantially corresponds to the movement direction of the elevator car 3, and is therefore substantially vertical.

The web arrangement 22 of the suspension device 15 has a plurality of round holes 33. Fixing elements (for example screws) are received in the round holes 33, by means of which fixing elements the web arrangement 22 and thus the suspension device 15 are fastened to the elevator car 3 or to the frame thereof substantially without play. By means of a corresponding design of the support means holding assembly 23 or the brake holding assembly 19, these elements can deform, in particular bend, slightly along the exerted force direction 39, relative to the web arrangement 22 when a force is brought about in the exerted force directions 38, 39 by activating the brake or by tensioning the support means.

Such a relative displacement brings about inter alia a deformation of the support means holding assembly 23 or of the brake holding assembly 19. In this case, the support means holding assembly 23 and the brake holding assembly 19 are arranged, dimensioned and configured in such a way that this deformation generally takes place elastically, at least as long as only forces which arise during normal operation of the elevator system 1 are brought about by the brake 17 or the support means 6.

The relative movements produced between the brake holding assembly 19 and the web arrangement 22, or between the support means holding assembly 23 and the web arrangement 22, can be used to be able to measure the loads or load changes currently acting on the elevator car 3, by means of the load measuring device 21.

For this purpose, in the embodiment shown the load measuring device 21 is fixedly connected, for example screwed, to the brake holding assembly 19. Furthermore, the force transmission element 25 is coupled, for example, to a part of the support means holding assembly 23. Electronics (not shown), arranged for example in the load measuring device 21, can be used for example to measure mechanical stresses that occur in the between the force transmission element 25 and the fixedly arranged element of the load measuring device 21 and the strain gage 27 contained therein, due to the forces generated by the relative movement. The electronics can then produce an electrical signal which can act as a measure of the force to which the load measuring device 21 is subjected. It is therefore possible not only to use the brake 17 of the suspension device 15 to brake the elevator car 3, but also to use the load measuring device 21 of the suspension device to measure a load acting on the elevator car 3 and to detect changing tensions in the support means 6.

FIG. 4 shows a further embodiment of a suspension device 15 according to the invention, the suspension device being formed in multiple parts in this case. In this embodiment, the load measuring device 21 is arranged in a U-shaped support means holding assembly 23, on which the support means 6 is arranged. The support means holding assembly 23 is connected on the support means holding assembly 19, which is arranged on the elevator car 3 (not shown).

Finally, it should be noted that terms such as "comprising," "including," etc. do not preclude other elements or steps, and terms such as "a" or "an" do not preclude a plurality. Furthermore, it should be noted that features or steps which have been described with reference to one of the above embodiments may also be used in combination with other features or steps of other embodiments described above.

In accordance with the provisions of the patent statutes, the present invention has been described in what is considered to represent its preferred embodiment. However, it should be noted that the invention can be practiced otherwise than as specifically illustrated and described without departing from its spirit or scope.

The invention claimed is:

1. A suspension device for an elevator system for securing a brake and a support means of the elevator system and for measuring a load acting on a car of the elevator system, the suspension device comprising:

a brake adapted to brake the elevator car at a guide rail of the elevator system;

a brake holding assembly holding the brake on the elevator car;

a support means holding assembly holding the support means on the elevator car, wherein the support means connects the elevator car to a counterweight of the elevator system;

wherein the brake holding assembly is adapted to deform relative to the elevator car in a force direction of a force produced by the brake interacting with the guide rail; and wherein the support means holding assembly is adapted to deform relative to the elevator car in a force direction produced by the support means.

2. The suspension device according to claim 1 including a load measuring device measuring an exerted force produced by the deformation of the support means holding assembly and/or of the brake holding assembly, wherein the load measuring device is arranged between the brake holding assembly and the support means holding assembly.

3. The suspension device according to claim 2 wherein the support means holding assembly and the brake holding assembly are each elastically deformable and are arranged on a web arrangement mounted on the elevator car.

4. The suspension device according to claim 1 wherein the brake holding assembly and the support means holding assembly are elastically deformable in response a force transmitted during a normal operation of the elevator system.

5. The suspension device according to claim 1 wherein the brake holding assembly and the support means holding assembly move towards one another or away from one another by less than 2 mm in response a force transmitted during a normal operation of the elevator system.

6. The suspension device according to claim 1 wherein the brake holding assembly and the support means holding assembly move towards one another or away from one another by less than 1 mm in response a force transmitted during a normal operation of the elevator system.

7. The suspension device according to claim 1 wherein the support means holding assembly and the brake holding assembly are arranged on a web arrangement mounted on the elevator car, and the brake holding assembly, the support means holding assembly and the web arrangement are formed in one piece as a common part.

8. The suspension device according to claim 7 wherein the common part is a stamped sheet metal part.

9. The suspension device according to claim 1 including a load measuring device measuring an exerted force produced by the deformation of the support means holding assembly and/or of the brake holding assembly, and at least one of:

the load measuring device includes a strain gage sensing the exerted force;

the load measuring device includes a force transmission element and is fixed to the brake holding assembly; and the load measuring device is arranged in the support means holding assembly.

10. The suspension device according to claim 9 wherein the load measuring device generates an electrical signal representing the exerted force acting on the force transmission element.

11. The suspension device according to claim 1 wherein the brake is at least one of a holding brake adapted to hold the elevator car during a stop and a safety brake adapted to brake the elevator car in an emergency.

12. An elevator system comprising:

an elevator car;

a guide rail;

the suspension device according to claim 1;

wherein the elevator car is movable along the guide rail;

wherein the suspension device is arranged on the elevator car; and wherein the brake of the suspension device cooperates with the guide rail to brake the elevator car.

13. The elevator system according to claim 12 wherein the suspension device is arranged in a lower half of the elevator car.

14. A method for measuring a load acting on an elevator car, the method comprising the steps of:

activating the brake of the suspension device according to claim 1, the suspension device being arranged on the elevator car, while the elevator car is stationary; and measuring a load acting on the elevator car by a load measuring device included in the suspension device.

15. A method for detecting a slack support means by measuring a load change, the method comprising the steps of:

measuring a change in the load measured according to claim 14; and determining that the load change is greater than a predetermined limit value thereby indicating a slack support means supporting the elevator car.

16. The method according to claim 15 wherein the load change is measured after stopping the elevator car at a floor and again immediately before departure, wherein the brake is transferred into a catch mode when the load change is greater than the predetermined limit value.

* * * * *